United States Patent
Schmid et al.

(10) Patent No.: US 9,434,498 B2
(45) Date of Patent: Sep. 6, 2016

(54) DEVICE FOR RECEIVING A WORKPIECE FOR A WORKPIECE CARRIER CIRCULATION SYSTEM OF A PRODUCTION MACHINE

(71) Applicant: Schaeffler Technologies AG & Co. KG, Herzogenaurach (DE)

(72) Inventors: Gunter Schmid, Nuremberg (DE); Ralf Schuler, Wichtshausen (DE); Andreas Fruhwald, Baudenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/646,167

(22) PCT Filed: Nov. 6, 2013

(86) PCT No.: PCT/DE2013/200272
§ 371 (c)(1),
(2) Date: May 20, 2015

(87) PCT Pub. No.: WO2014/082634
PCT Pub. Date: Jun. 5, 2014

(65) Prior Publication Data
US 2015/0298845 A1    Oct. 22, 2015

(30) Foreign Application Priority Data

Nov. 28, 2012  (DE) .......................... 10 2012 221 719

(51) Int. Cl.
| | | |
|---|---|---|
| *B65C 9/06* | (2006.01) | |
| *B65G 47/84* | (2006.01) | |
| *B65C 9/04* | (2006.01) | |
| *B65G 47/244* | (2006.01) | |

(52) U.S. Cl.
CPC . *B65C 9/06* (2013.01); *B65C 9/04* (2013.01); *B65G 47/244* (2013.01); *B65G 47/846* (2013.01); *B65G 2201/0261* (2013.01)

(58) Field of Classification Search
CPC .. B65G 29/00; B65G 47/244; B65G 47/846; B65G 47/848; B65G 2201/0261; B65C 9/04; B65C 9/06
USPC ................... 198/376, 377.01–377.06, 377.1
See application file for complete search history.

(56) References Cited

U.S. PATENT DOCUMENTS

| | | | | |
|---|---|---|---|---|
| 8,777,000 | B2 * | 7/2014 | Kramer ..................... | B65C 9/04 198/803.14 |
| 8,907,538 | B2 * | 12/2014 | Zacche' ..................... | B65C 9/04 310/153 |
| 8,994,959 | B2 * | 3/2015 | Beckhaus ............... | B41F 17/18 356/138 |
| 2005/0265881 | A1 | 12/2005 | Davidson et al. | |
| 2012/0011807 | A1 * | 1/2012 | Preckel .................. | B41J 3/4073 53/167 |
| 2014/0202831 | A1 * | 7/2014 | Varhaniovsky ........ | B41J 3/4073 198/465.2 |
| 2014/0374016 | A1 * | 12/2014 | Schach .................. | B41J 3/4073 156/277 |

FOREIGN PATENT DOCUMENTS

| | | |
|---|---|---|
| DE | 102004026755 | 12/2005 |
| WO | 9502539 | 1/1995 |

* cited by examiner

*Primary Examiner* — Leslie A Nicholson, III
*Assistant Examiner* — Keith R Campbell
(74) *Attorney, Agent, or Firm* — Volpe and Koenig, P.C.

(57) ABSTRACT

A device for receiving a workpiece for a workpiece carrier circulation system of a production machine is provided, including a workpiece carrier with a workpiece receiver and a holder to be arranged on the machine for receiving the workpiece carrier in a detachable, temporary manner. The workpiece carrier includes a rotor section (5) which, when the workpiece carrier is received in the holder, interacts with a stator (20) provided on the holder, forming a torque motor and thus being rotatable about an axis in the holder.

9 Claims, 4 Drawing Sheets

DEVICE FOR RECEIVING A WORKPIECE FOR A WORKPIECE CARRIER CIRCULATION SYSTEM OF A PRODUCTION MACHINE

FIELD OF THE INVENTION

The invention relates to a device for receiving a workpiece for a workpiece carrier circulating system of a production machine, comprising a workpiece carrier with a workpiece receiver and a holder arranged on the machine side for the detachable, temporary holding of the workpiece carrier.

BACKGROUND

In the scope of the production or processing of workpieces of the same type, it is often required to perform several processing steps on such a workpiece one after the other. For this purpose it is known to transport the workpiece to different processing stations of a production machine by means of a workpiece carrier circulating system. Such a workpiece carrier circulating system comprises only two essential elements, namely, for one, the workpiece carrier itself that has a workpiece receiver that is designed with respect to the workpiece to be held. During several work processes, the workpiece remains on this workpiece carrier or in the workpiece receiver and the workpiece carrier is moved from one processing position to another. For this purpose, on the machine side there is a corresponding holder as the second part in which the workpiece carrier is detachably inserted or on which it is held detachably for the period during which it is located in the processing area of the production machine. Such workpiece carrier circulating systems can be used, for example, in carousel machines or rotary table machines that are often used in the automotive industry, or in installation, testing, and labeling machines, as well as in feeding systems for machine tools. The use of such workpiece carrier circulating systems is also conceivable in labeling machines of container processing and bottling systems for adhering labels onto containers and bottles that here form the workpieces. Each conveyor operation can be continuous or cycled, wherein, depending on the conveyor operation, each process takes place in a processing station either on the workpiece currently moving by in continuous conveyance or during the holding operation. The corresponding work can be of a wide range of different types. It could be either installation processes, that is, additional individual parts are attached to the held workpiece. It could be testing or measurement processes. It could be printing or labeling processes, for example, by means of pad printing or inkjet printing, etc.

The essential elements are, as described, the workpiece carrier and the holder that temporarily and detachably holds it. In this way, the workpiece carrier is typically held tightly in the holder. Consequently, it is required, however, to move the workpiece into a certain position, for example, bottles to be labeled must be rotated about their longitudinal axis, to enable labeling. For this purpose, it is known to rotate the bottles themselves by means of a corresponding rotary drive, wherein these bottles are held accordingly so that they can move in the workpiece holder. Alternatively, it is known to couple the workpiece carrier detachably and temporarily to a drive as such at the processing station, where workpiece rotation is required, in order to rotate it after detachment from the holder. All of these constructions for enabling workpiece rotation are very complicated and they require special drives or mechanical couplings and are also susceptible to disruptions.

SUMMARY

The invention is based on the objective of providing a workpiece receiving device as part of a workpiece carrier circulating system that enables, in a simple way, circulating of a held workpiece.

To achieve this objective, for a device of the type noted above it is provided according to the invention that the workpiece carrier that can rotate about an axis and can be held in the holder has a rotor section that interacts, when held in the holder, with a stator provided on the holder, with this interaction forming a torque motor.

In the device according to the invention, a rotating connection of the workpiece carrier and holder is provided, that is, the workpiece carrier, when it is held in the holder, can be rotated about a defined rotational axis and with it naturally also the workpiece, so that this can be moved or, very basically, rotated into a certain desired position. In addition, the workpiece carrier itself forms part of the rotary drive, because it has, according to the invention, a rotor section that forms a central part of a torque motor. The other central part, namely the stator, is provided on the holder. Now if a workpiece carrier is moved into a holder and is fixed there, then, when this end position is reached, where, as mentioned, the workpiece carrier is held so that it can rotate, simultaneously also the torque motor is "assembled," that is, the rotor section is positioned relative to the stator, so that both can interact, with this interaction forming a torque motor.

With such a torque motor that is based, in a known way, on the fact that a magnetic traveling field is generated by means of the stator, wherein this field interacts with the magnetic elements of the rotor section that follow the traveling field and wherein this arrangement leads to rotation, a high precision drive is realized that can also transmit high torques. In other words, because a precise centering or positioning of the workpiece is possible, which is required for many processes, a rotation is also possible in a very simple way. In particular, this is a contact-less drive that is ultimately wear-free and can have a space-saving construction. It can also be controlled in a highly flexible way, which is advantageous for an exact control of the rotational operation.

An especially compact and space-saving construction can be obtained if the rotor section is constructed as a rotating projection that extends radially and has integrated permanent magnets and is held, in the held position, between stator windings of the stator that is open at the side, with these windings being arranged on the holder side at a distance from each other. The ring-shaped, rotating projection is provided with corresponding permanent magnets that are magnetized parallel to the rotational axis of the workpiece carrier. If this projection, that is, the rotor, is located between the stator windings of the stator that is open at the side, so that it can be pushed in from the side between these windings, then the magnetic field of the permanent magnets is perpendicular to the stator windings. If a traveling field is generated on this side, then the rotor necessarily follows this traveling field due to the magnetic interaction of the traveling stator field with the field or fields of the permanent magnets.

Because the stator, as described, is open at the side, it is possible to move the workpiece carrier from the side toward the holder, if the holder is similarly open at the side, and to simultaneously also move the rotor section between the stator windings with insertion into the holder. In other words, when the workpiece carrier is moved into the holder, the torque motor is also necessarily and automatically "assembled."

The stator windings of each side are preferably connected by means of a magnetically conductive plate, so that the magnetic flux is short circuited. The respective plates are made from a material of high magnetic conductivity, that is, with high permeability. The stator windings themselves are advantageously constructed as multilayer plates.

To produce, in a simple way, a rotating bearing of the workpiece carrier in the holder, an especially advantageous refinement of the invention provides that, on the workpiece carrier, there is at least one rolling bearing, in the held position, with an outer ring that interacts either directly via the outer ring or via a fastening element connected to it detachably with a fixing device of the holder. The holder thus engages either directly on the outer ring or on a fastening element connected rigidly to the outer ring. If the outer ring is fixed by means of the holder or its fixing device, then the workpiece carrier can be forced to rotate in the outer ring in which it is supported so that it can rotate by means of the roller bodies. Although one roller body, which can have an axially prolonged construction for absorbing any tilting moments, is already sufficient, it is preferred to provide two roller bodies set one above the other, consequently, realizing virtually a two-row rolling bearing with corresponding axial overall length to be able to receive any tilting moment.

As described, the workpiece carrier is fixed only temporarily in the holder; it is held detachably in this and can be removed from it again. This is necessary to transfer the workpiece carrier in an automated way from a feeding device to the production machine and to remove it again via a corresponding removal device. To allow an especially preferred, but also simultaneously simple fixing, a preferred refinement of the invention provides that the fixing device of the holder interacts magnetically with the outer ring or the fastening element. In other words, because there is no mechanical jamming or locking or the like, but instead the workpiece carrier is held rigidly in the holder just magnetically. This naturally requires, on one hand, that a corresponding magnetic field generating device is provided on the holder side or on the side of the fixing device, as well as, on the other hand, naturally also the outer ring or the fastening element is made from a magnetizable or interactive material.

Here it is conceivable to design the magnetic field generating device as a simple permanent magnet if its magnetic field is sufficient to cause a sufficiently rigid fixing. An especially advantageous refinement of the invention provides that the fixing device has a magnetic field generating device by means of which a magnetic field that is variable in intensity can be generated. This construction of the invention advantageously offers the ability to change the field intensity and thus ultimately the holding force as a function of the requirements or situation. For example, if the workpiece carrier is transferred from the feeding device into the holder, then initially a lower magnetic field is produced there that is amplified with the transfer to enable a rigid fixing. If the workpiece carrier is removed again, then after coupling the removal device, the magnetic field is reduced again, consequently, the workpiece carrier fixing is "weakened," so that the removal device can remove the workpiece carrier from the holder.

One possibility according to the invention for realizing this situation provides that the magnetic field generating device has a magnetic yoke formed of at least one permanent magnet held between two pole shoes and also at least one energizable coil that is wound around the magnetic yoke and generates a magnetic field that reinforces or weakens the magnetic field of the permanent magnet. Here, a basic magnetic field is given by means of the permanent magnet or the magnetic yoke. To change this magnetic field, the coil is used which can superimpose, depending on the direction of energization, a magnetic field that reinforces or weakens the field of the permanent magnet. In this way, the holding magnetic force of the holding magnet can be changed arbitrarily.

The fixing device, in particular, the two pole shoes, preferably have a contact surface or contact contour that forms a positive-locking contact on the outer ring or fastening element and has a rounded construction for direct contact or is shaped according to the element contour for contact on a fastening element. In each case, a defined positive-locking connection is produced, so that a secure fixing is given when the corresponding fixing mechanism is activated, for example, the magnetic holding mechanism described above. At this point it should be noted that obviously other holding mechanisms can also be provided that are of a purely mechanical nature, for example, through engagement of corresponding holding tabs or the like.

Consequently, it is necessary to realize not only a basic rotational ability of the workpiece or the workpiece carrier, but also to move the workpiece or the workpiece carrier into a certain defined position or to detect any changes in position. For this purpose, a refinement of the invention provides for the integration of a position measuring device for determining the angular position of the workpiece carrier relative to the stator. This position measuring device can measure the position either incrementally or absolutely. In each case, this arrangement determines position information that makes it possible to determine the exact relative position of the workpiece.

The position measuring device itself can work in accordance with any measurement principle, for example, inductive, optical, or magnetoresistive scanning can be performed. The measuring device advantageously has a contact-less operation.

To enable this in a simple way, the position measuring device has one or more measuring elements that are provided on the workpiece carrier and rotate with it, in particular, a measuring ring, and also a measurement sensor provided on the stator side for the contact-less detection of the measuring element or elements. Preferably, a rotating measuring ring is provided on which corresponding incremental measuring points or the like are provided that can be detected by the measurement sensor according to the measurement method. The sensor can have, as described, an inductive, optical, or magnetoresistive operation. It communicates with the higher level control device that controls the entire operation of the production machine so that the corresponding position information is present on that side and either the torque motor is controlled accordingly to move the workpiece carrier into the desired position or, if the positioning is correct, the associated processing unit is controlled accordingly.

BRIEF DESCRIPTION OF THE DRAWINGS

An embodiment of the invention is shown in the accompanying drawings and is described in more detail below. Shown are.

DETAILED DESCRIPTION OF THE PREFERRED EMBODIMENTS

Figure 1:
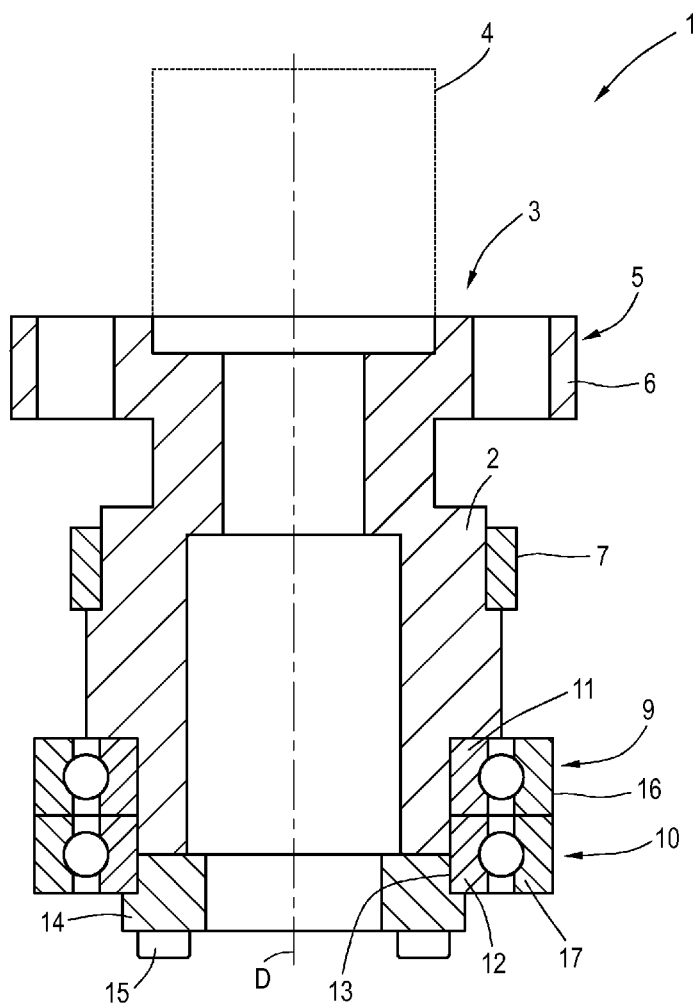
FIG. 1 a basic diagram of a workpiece carrier according to the invention in cross section, FIG. 2 a basic diagram of a holder according to the invention in cross section, FIG. 3 a basic diagram of the device according to the invention with workpiece carrier held in the holder in a detail view, in cross section, FIG. 4 a perspective view of the device according to the invention with workpiece carrier held in the holder, and FIG. 5 a basic diagram of a production machine according to the invention comprising several rotating processing tables with several holders in which corresponding workpiece carriers are held and between each of which the workpiece carriers can be exchanged.

FIG. 1 shows a workpiece carrier 1 in a section diagram. The workpiece carrier 1 comprises a hollow cylindrical carrier body 2 made, for example, from aluminum. On its top side there is a workpiece receiver 3 in which, shown with dashed lines, a workpiece 4 to be processed is held detachably. The workpiece 4 can be any workpiece, for example, a metal part on which corresponding processing measures can be performed, a workpiece to be equipped with components to be attached or other individual parts or a workpiece to be labeled or a glass or plastic bottle to be labeled, etc.

Figure 4:
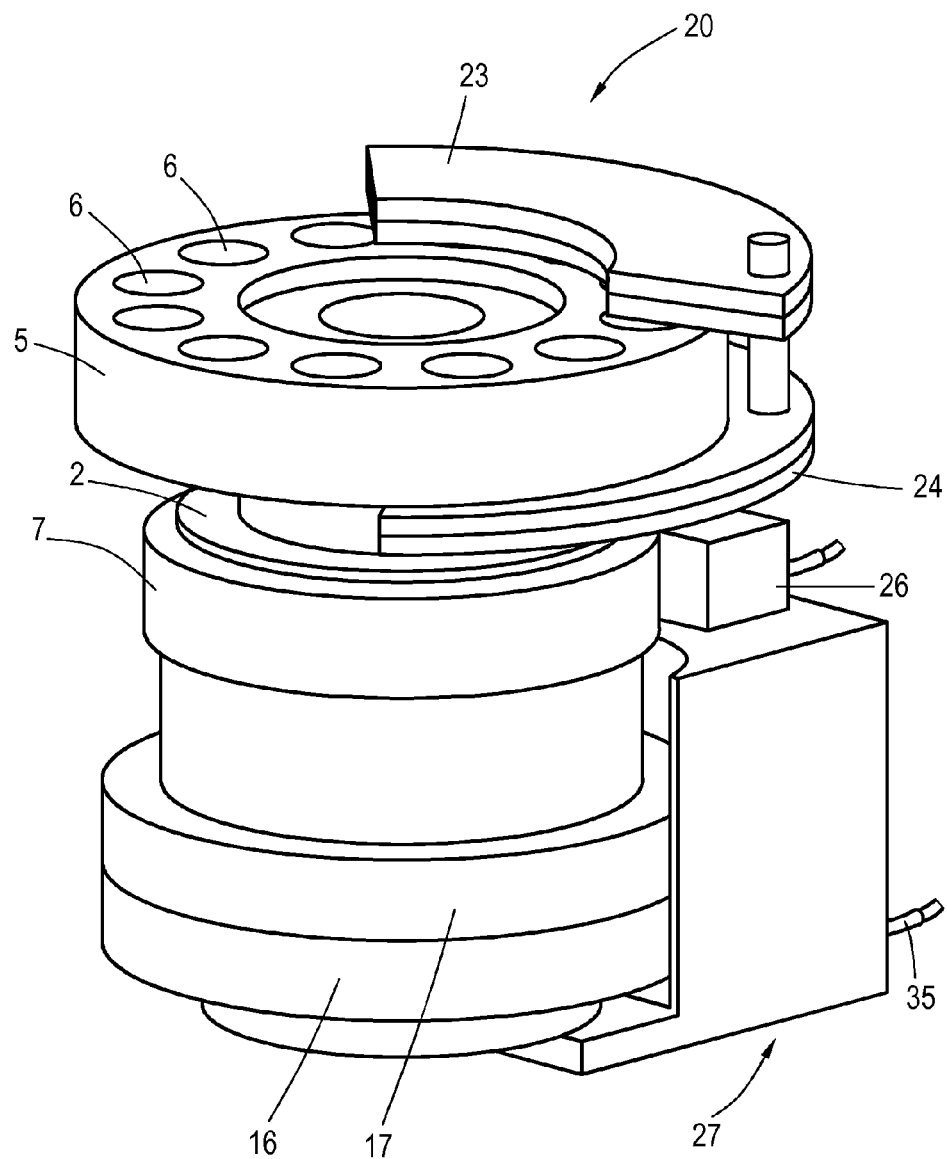

On the upper end of the carrier body 2 there is a radially extending, rotating projection 5 on which a plurality of individual permanent magnets 6 are held at equidistant distribution (see also FIG. 4). The permanent magnets are arranged so that their magnetic field is parallel to the rotational axis D of the workpiece carrier 1.

Also provided is a measuring ring 7 that is part of a position measuring device that is used for the incremental or absolute detection of the angle or the relative position of the workpiece carrier 1 to the holder to be described below. On the measuring ring 7 there can be a plurality of individual incremental measuring elements, for example, reflection elements, grooves, etc., to be detected by means of a measurement sensor still to be described in an equidistant and circumferential arrangement, in other words, detectable elements that can be used to detect a position signal.

In addition, on the workpiece carrier 1 there are two rolling bearings 9, 10 that are fixed by means of their inner rings 11, 12 in a corresponding rolling bearing receiver 13 on the carrier body 2 and are clamped by means of a clamping ring 14 that is screwed onto the carrier body 2 by means of corresponding threaded connections 15. The rolling bearings 9, 10 have the same diameter, which applies, in particular, for their two outer rings 16, 17, because by means of these parts the fixing in the holder to be described below is realized. Instead of the installation of two such rolling bearings 9, 10 that are here constructed as grooved ball or spindle bearings, it would fundamentally also be conceivable to integrate only one rolling bearing that is then constructed, for example, as a wider needle bearing viewed axially. Like the two rolling bearings 9, 10, a correspondingly wide needle bearing can also enable receiving any tilting moments in the held position.

Figure 2:
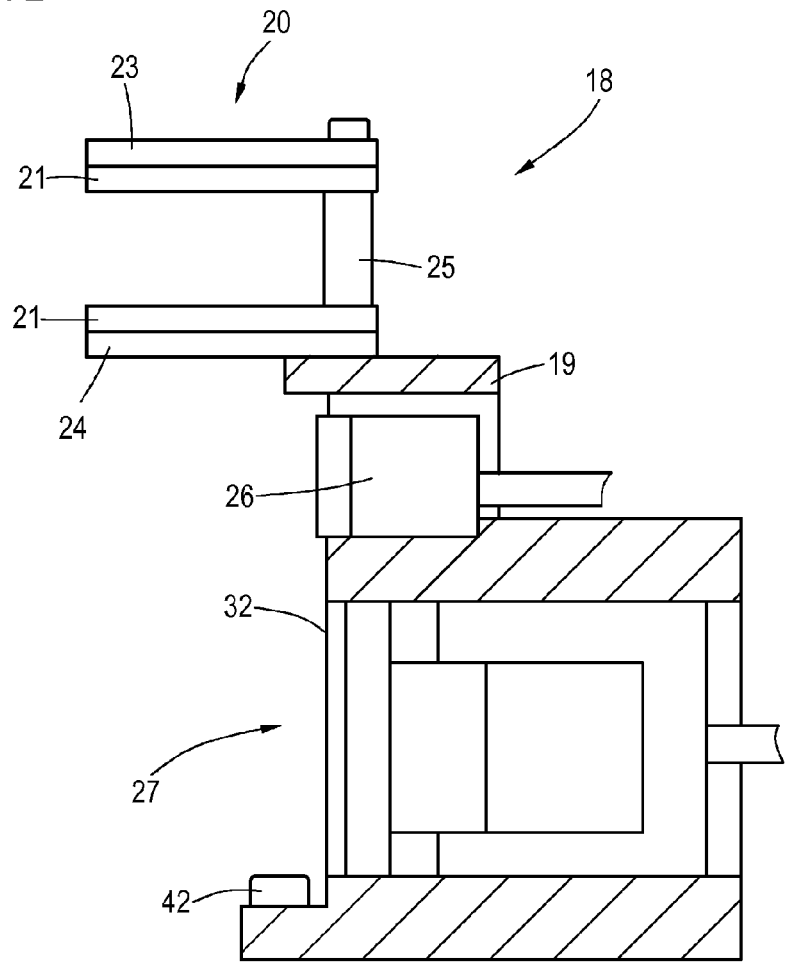

FIG. 2 shows a sectioned basic diagram of a holder 18 that is used for the temporary holding of a workpiece carrier 1, as shown in FIG. 1. The holder 18 also has a corresponding central holder body 19 constructed accordingly, for example, as a cast part. On it there is, on one hand, a stator 20 comprising two stator windings 21, 22 that are spaced apart from each other and that each include a plate 23, 24 made from a material, for example, steel, that has good conductive properties for the magnetic flux, that is, has high permeability. The stator windings 21, 22 that can be energized by means of a control device not shown in more detail are advantageously constructed as multilayer plates. As can be seen in FIG. 4, at least the plates 23, 24, but advantageously also the corresponding stator windings 21, 22 extend over a certain angle increment, so that a magnetic traveling field traveling over this angle increment can be generated by means of the stator windings 21, 22. The stator 20 is open at the side, as can be seen, and by means of the connecting rod 25, a U-shaped basic structure is realized. The stator 25 forms the second part of a torque motor that is completed by the rotor section 5 of the workpiece carrier 1 in the held state.

On the holder body 19 there is also a measurement sensor 26 that scans the measuring ring 7 in the held position using a contact-less method, in order to generate exact, high precision position information. The measurement sensor 26 and measuring ring 7 thus form an incremental or absolute angle measurement system.

To hold the workpiece carrier 1 temporarily and to simultaneously fix it so that it can rotate, a fixing device 27 is provided on the holder body 19, wherein this fixing device interacts magnetically with the two outer rings 16, 17 of the two rolling bearings 9, 10. This fixing device that is shown in principle in FIG. 3, comprises a magnetic field generating device 28 that is in the position, on one hand, to generate a basic magnetic field and, on the other hand, a variable additional magnetic field that can be superimposed on the basic field. For this purpose there are two pole shoes 29, 30 that are both made from magnetically good conductive steel and between which a permanent magnet 31 is placed. In other words, the field of the permanent magnet is guided by means of the two pole shoes on the contact surface 32 that is formed by the two pole shoes 29, 30 and the sealing compound 33. Pole shoes 29, 30 and permanent magnet 31 consequently form a yoke. To be able to change the magnetic field that is applied to the contact surface 32 in its intensity, a coil 34 is provided that can be energized via the cable 35 by means of a control device not shown in more detail. Depending on the functional principle or direction of energization, a magnetic field can be induced in the pole shoes 29, 30, wherein this field is rectified to the field of the permanent magnet 31, so that overall a total magnetic field that is amplified relative to the permanent magnetic field is generated. If the coil field is oriented in the opposite direction, a defined field weakening can be realized.

To guarantee an exact centering of a workpiece carrier 1 to be moved into a holder 18, there are centering pins 42 or the like on the holder side, which interact with corresponding centering receivers on the workpiece carrier 1.

The permanent magnet 31 and also the permanent magnets 6 on the rotor section 5 can be made from any materials generating a sufficient field, for example, ferrite, samarium cobalt, or neodymium iron boron. The sealing compound 33 that encapsulates the fixing device 27 as an encapsulated part can be, for example, PUR, epoxy resin, or a one-component or two-component casting resin.

Figure 3:
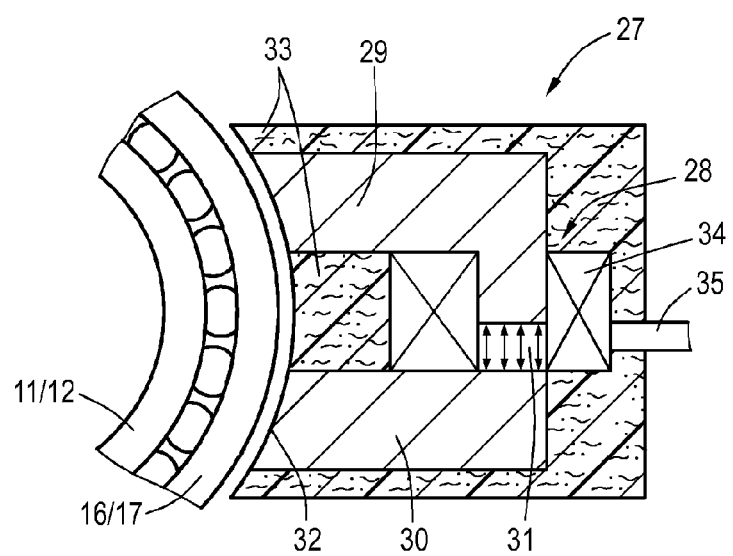

As FIGS. 2 and 3 show, not only is the stator 20 open on the side, but also the fixing device 27 is open on the side, that is, the contact surface 32 is exposed.

If a workpiece carrier 1 is now to be fixed in the holder 18, the workpiece carrier 1 is inserted from the side into the rounded holder 18 approximately corresponding to the workpiece carrier shape. The two outer rings 16, 17 of the rolling bearings 9, 10 are moved in the direction of the contact surface 32 and thus the fixing device 27. The outer rings move into the area of the magnetic field generated by means of the magnetic field generating device 28, that is, they are drawn in. In the held position, they form a positive-locking contact on the contact surface 32. Consequently they close the magnetic circuit. The magnetic field of the permanent magnet 31 is dimensioned so that a holding force is produced without an additional field generated by means of the coil 34 and this holding force guarantees that the inserted workpiece carrier 1 is fixed securely (fail-safe). By means of the magnetic field generated by the coil 34 when it is detected, for example, by means of the measurement sensor 26 that the correct insertion position has been reached (which is obviously possible without additional elements), the overall holding magnetic field can be reinforced, so that a secure fixing during the subsequent processing steps is realized. If the workpiece carrier 1 is to be removed, by changing the direction of energization, a coil magnetic field can be generated that is arranged opposite the field of the permanent magnet, so that the overall magnetic field is significantly weakened and the workpiece carrier 1 can be removed from the holder 18 without additional means.

At the same time as the insertion of the two outer rings 16, 17 into the fixing device 27, the rotor section 5 moves between the two stator windings 21, 22, that is, into the stator 20. When the final inserted position is reached, the permanent magnets 6 of the rotor section 5 are consequently precisely positioned between the stator windings 21, 22 and can interact with the magnetic field generated on the stator side. This held position is shown in FIG. 4. It can be seen that the rotor section 5 is located in the stator 20, like the outer rings 16, 17 are also located in the fixing device 27.

Now if the workpiece carrier 1 and with it the workpiece 4 not shown in more detail in FIG. 4 are to be rotated or moved into a certain position, then by means of the control device not shown in more detail here, the stator is controlled accordingly or the stator windings 21, 22 are energized accordingly, so that a magnetic traveling field is produced that is followed by the permanent magnets 6 of the rotor section 5, so that it causes rotation about the rotational axis D. This is possible without additional means, after the outer rings 16, 17 are fixed in the fixing device 27, that is, the workpiece carrier 1 turns relative to its outer rings 16, 17. By means of the measurement sensor 26, the measuring ring 7 rotating past it is detected and scanned in a contact-less manner, so that corresponding position information can be detected. The measurement sensor 27 can have inductive, optical, or magnetoresistive operation, with the measuring ring 7 or the measuring elements provided on it naturally being constructed in accordance with this operation.

Figure 5:
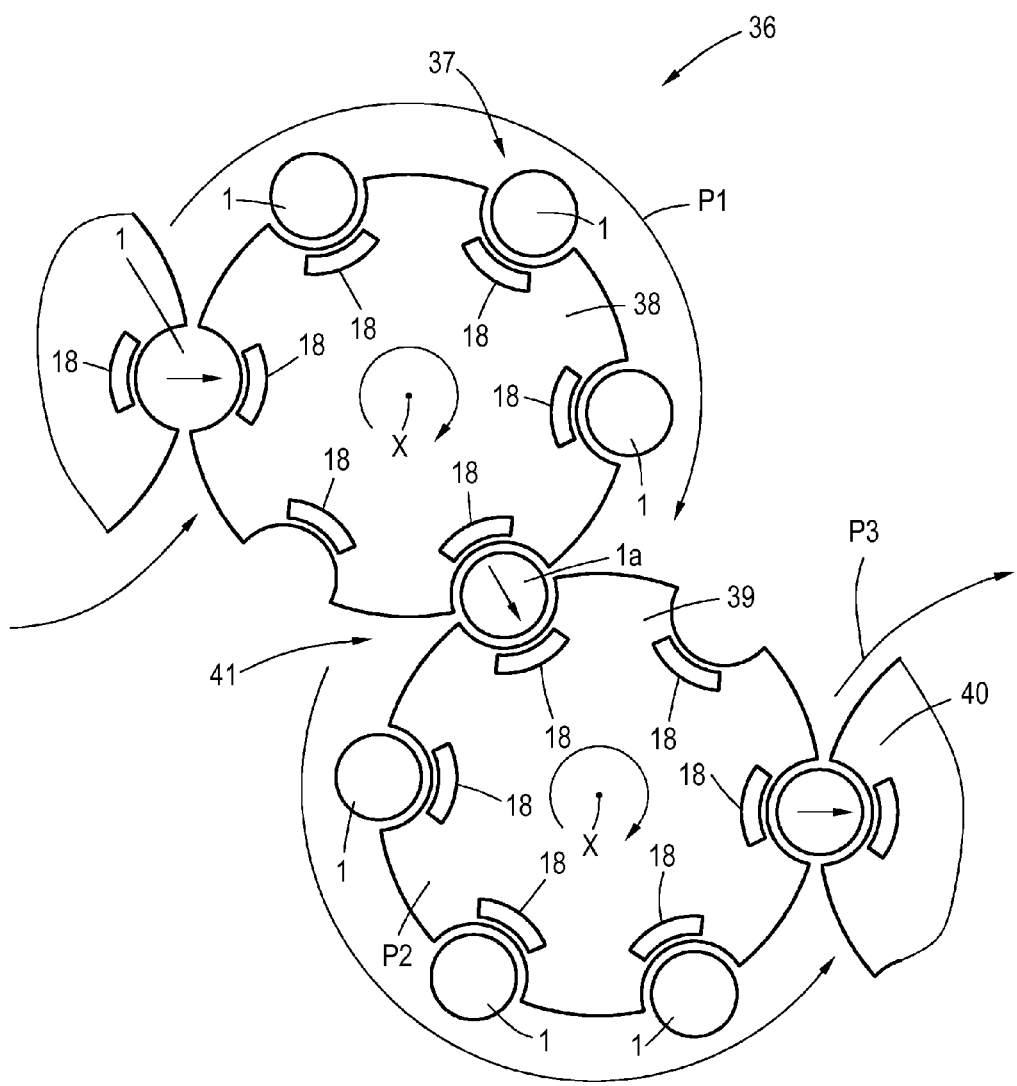

FIG. 5 shows, in the form of a basic diagram, a production machine 36 comprising a workpiece carrier circulating system 37, which contains the workpiece carrier 1 comprising the device according to the invention and holder 18. As an example, as parts of the production machine 36, rotary tables 38, 39, 40 are shown respectively. Each rotary table 38, 39, 40 can rotate about an axis X. On each rotary table 38, 39, 40 there are several holders 18 distributed about the circumference, in the shown example, six holders. These are connected rigidly to the respective rotary table, thus they rotate with these. The directions of rotation of each table are shown by means of the arrows P1, P2, and P3. The individual holders 18 are provided on the rotary tables 18 on or in the area of corresponding pockets. The holders 18 are here shown only as examples, also like the individual workpiece carriers 1 that are held at least partially visible in the pockets 18. The fixing of the workpiece carrier in each holder is realized by means of the fixing device 27 described with respect to FIG. 3, that is, the magnetic field generating device 28. As can be seen, two adjacent rotary tables are arranged in the area of a transfer point 41 relatively close to each other. In this area, a workpiece carrier 1 can be transferred from a holder 18 of a rotary table to a holder 18 of the adjacent rotary table. As an example, this is shown for the holder 1a that is transferred from the holder 18 of the rotary table 38 to the holder 18 of the rotary table 39 that is opposite it at the moment of transfer. To be able to perform the transfer process in a defined and reliable way, the coil 34 of the issuing holder 18 on the rotary table 37 is energized accordingly with a time offset in front of the transfer point 41, so that the holding force, that is, the resulting overall magnetic field, is significantly weakened on that side. In addition, with a time offset in front of the transfer point 41, the coil 34 of the receiving holder 18 can be energized accordingly on the rotary table 39, so that its holding force or the produced overall magnetic field is increased significantly. This results in an attraction force, resulting from the strong magnetic field on the part of the holder 18 on the rotary table 39 on the workpiece carrier 1a or the outer rings 16, 17. This magnetic field or this attraction force acts in the direction of the receiving holder 18 and ultimately causes the transfer or take-over of the workpiece carrier 1a from the rotary table 38 to the rotary table 39. Because the rotary tables 38, 39, 40 are synchronized in their rotation, it is guaranteed that an issuing holder with the workpiece carrier and a receiving holder lie opposite each other at the correct point in time.

After transfer of a workpiece carrier, this can then be moved by means of the holder 18 without additional means into the desired rotational position or, in principle, rotated, which is possible without additional means by means of the torque motor formed in this way consisting of the stator 20 of the holder 18 and the rotor section 5 of the held workpiece carrier 1.

Although in the shown example according to FIG. 5 the individual rotary tables 38, 39, 40 are described as part of a production machine, it is obviously also conceivable that each rotary table is part of a separate production machine, that is, part of a separate rotary table machine, wherein the multiple production or rotary table machines are integrated into one system.

| List of reference numbers | |
|---|---|
| 1 | Workpiece carrier |
| 1a | Workpiece carrier |
| 2 | Carrier body |
| 3 | Workpiece receiver |
| 4 | Workpiece |
| 5 | Projection |
| 6 | Permanent magnet |
| 7 | Measuring ring |
| 9 | Rolling bearing |
| 10 | Rolling bearing |
| 11 | Inner ring |
| 12 | Inner ring |
| 13 | Rolling bearing receiver |
| 14 | Clamping ring |
| 15 | Threaded connections |
| 16 | Outer ring |
| 17 | Outer ring |
| 18 | Holder |
| 19 | Holding body |
| 20 | Stator |
| 21 | Stator winding |
| 22 | Stator winding |
| 23 | Plate |

-continued

List of reference numbers

| | |
|---|---|
| 24 | Plate |
| 25 | Connecting rod |
| 26 | Measurement sensor |
| 27 | Fixing device |
| 28 | Magnetic field generating device |
| 29 | Pole shoe |
| 30 | Pole shoe |
| 31 | Permanent magnet |
| 32 | Contact surface |
| 33 | Sealing compound |
| 34 | Coil |
| 35 | Cable |
| 36 | Production machine |
| 37 | Workpiece carrier circulating system |
| 38 | Round table |
| 39 | Round table |
| 40 | Round table |
| 41 | Transfer point |
| P1 | Arrow |
| P2 | Arrow |
| P3 | Arrow |
| D | Rotational axis |

The invention claimed is:

1. A device for receiving a workpiece for a workpiece carrier circulating system of a production machine, comprising a workpiece carrier with a workpiece receiver and a holder arranged on a machine side for detachable, temporary holding of the workpiece carrier, the workpiece carrier is rotatable about an axis (D), and is holdable in the holder, and has a rotor section that interacts, when it is held in the holder, with a stator provided on the holder and this interaction forms a torque motor, the rotor section is constructed as a rotating projection that extends radially and has integrated permanent magnets and is held, in a held position, between stator windings of the stator that is open at a side, with said windings being arranged at a distance from each other on the holder side.

2. The device according to claim 1, wherein the stator windings of each side are each connected to a magnetically conductive plate.

3. The device according to claim 1, wherein on the workpiece carrier there is at least one rolling bearing with an outer ring that interacts, in the held position, detachably with a fixing device of the holder directly by the outer ring or by a fastening element connected to the outer ring.

4. The device according to claim 3, wherein the fixing device interacts magnetically with the outer ring or the fastening element.

5. The device according to claim 4, wherein the fixing device has a magnetic field generating device which generates a magnetic field of variable intensity.

6. The device according to claim 5, wherein the magnetic field generating device has a magnetic yoke including at least one permanent magnet held between two pole shoes and also at least one coil that is energizable and is wound about the magnetic yoke and induces a magnetic field that reinforces or lessens a magnetic field of the permanent magnet.

7. The device according to claim 4, wherein the fixing device has a contact surface that forms a positive-locking contact on the outer ring or on the fastening element.

8. The device according to claim 1, further comprising a position measuring device for determining an angle position of the workpiece carrier relative to the holder.

9. The device according to claim 8, wherein the position measuring device has one or more measuring elements that is provided on the workpiece carrier and rotates with it, and also a measurement sensor provided on a sensor side for the contact-less detection of the measuring element or elements.

* * * * *